ARTICULATED HOSE DERRICK

Original Filed Nov. 23, 1962 4 Sheets-Sheet 1

INVENTOR.
EDWARD S. SHEIRY
BY
W. Lee Halum
attorney

ARTICULATED HOSE DERRICK

Original Filed Nov. 23, 1962 4 Sheets-Sheet 3

INVENTOR.
EDWARD S. SHEIRY
BY H. Lee Helms
Attorney

ARTICULATED HOSE DERRICK

Original Filed Nov. 23, 1962 4 Sheets-Sheet 3

INVENTOR.
EDWARD S. SHEIRY
BY H. Lee Helms
attorney

ARTICULATED HOSE DERRICK

Original Filed Nov. 23, 1962 4 Sheets-Sheet 4

INVENTOR.
Edward S. Sheiry
by H. Lee Helms
ATTORNEY.

United States Patent Office

Re. 26,351
Reissued Feb. 20, 1968

26,351

ARTICULATED HOSE DERRICK

Edward S. Sheiry, Bronxville, N.Y., assignor to Hose Booms, Inc., New York, N.Y., a corporation of New Jersey Original No. 3,228,421, dated Jan. 11, 1966, Ser. No. 239,517, Nov. 23, 1962. Application for reissue Mar. 2, 1966, Ser. No. 532,554
9 Claims. (Cl. 137—615)

Matter enclosed in heavy brackets [ ] appears in the original patent but forms no part of this reissue specification; matter printed in italics indicates the additions made by reissue.

This invention relates to marine hose derricks and appurtenances for supporting, simultaneously manipulating, and positioning a plurality of pipe and flexible hose conduits extending from a stationary or relatively stationary terminal, to a point of coupling and uncoupling the assembly to manifold means for transferring fluid to and from said terminal, and it constitutes the provision of improvements in the subject of my patent, No. 2,922,446. The invention is particularly adapted for handling and effecting conduit connections between [short] *shore* terminals and ship's manifolds. Such [short] *shore* outlets are generally on wharfs or piers, and because of the great weight of hose-conduits, their unwieldly nature, and the effect of wind and tides, the function of handling and accurately positioning and aligning the outer ends of the hose for connection with a ship's manifolds without great manual effort, involves many problems which are overcome by the present invention, and whereby large dimensioned hose of great weight may be quickly and accurately positioned, so that they may be secured to receiving manifolds while held in position, regardless of the height or angle of the ship's deck with relation to the wharf, pier or other terminal.

The invention will be described with reference to the accompanying drawings, in which:

FIGURE 1 is a side elevation, showing by full and dotted lines the pivoted primary boom and auxiliary boom in raised position, and also when lowered to a degree which the hose is connected to the manifold means of a tanker, the latter being diagrammatically shown. The view includes a tower and its appurtenant elements for operating and counterweighting the primary boom and its auxiliary boom or booms.

Figure 1:
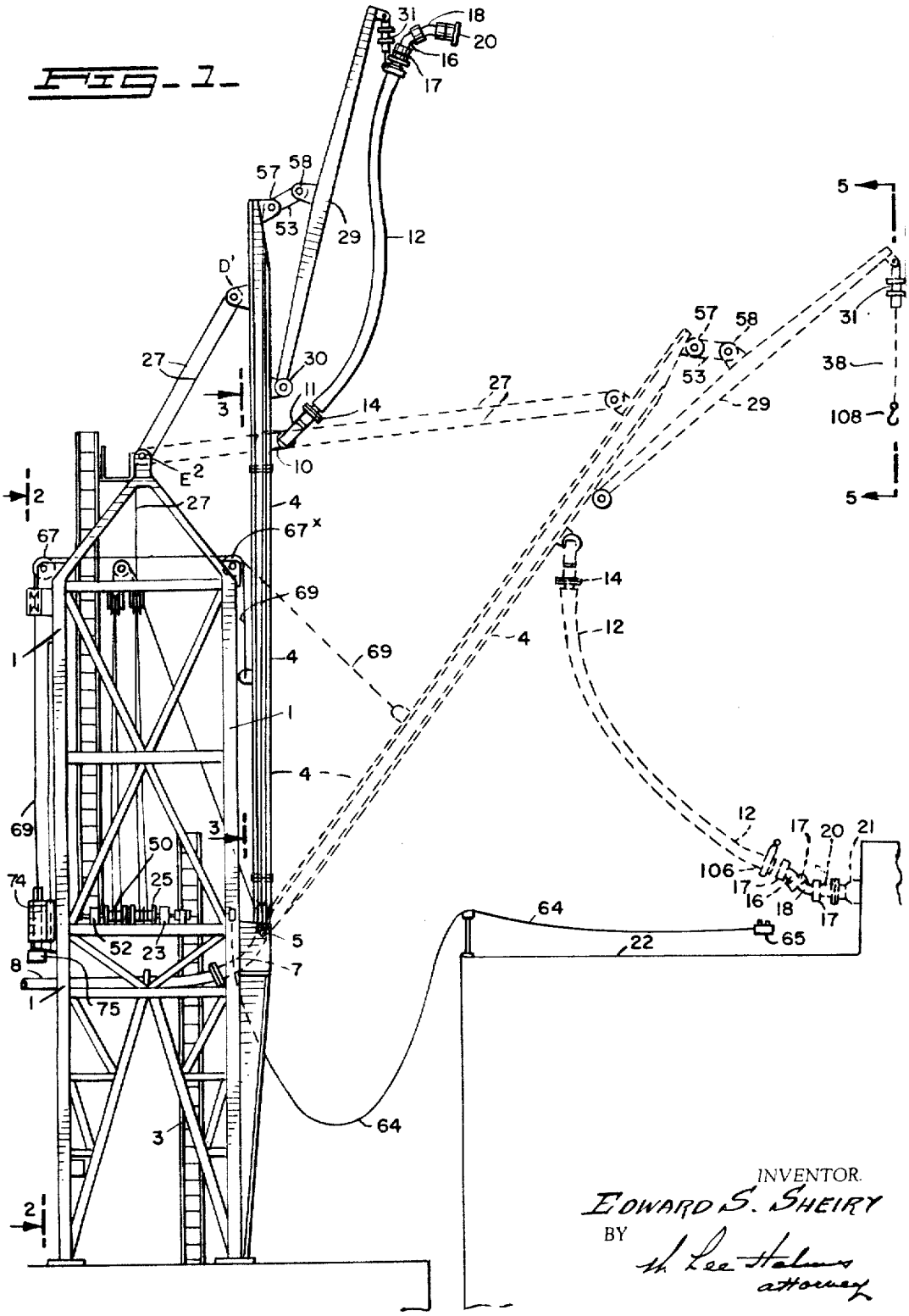
Figure 2:
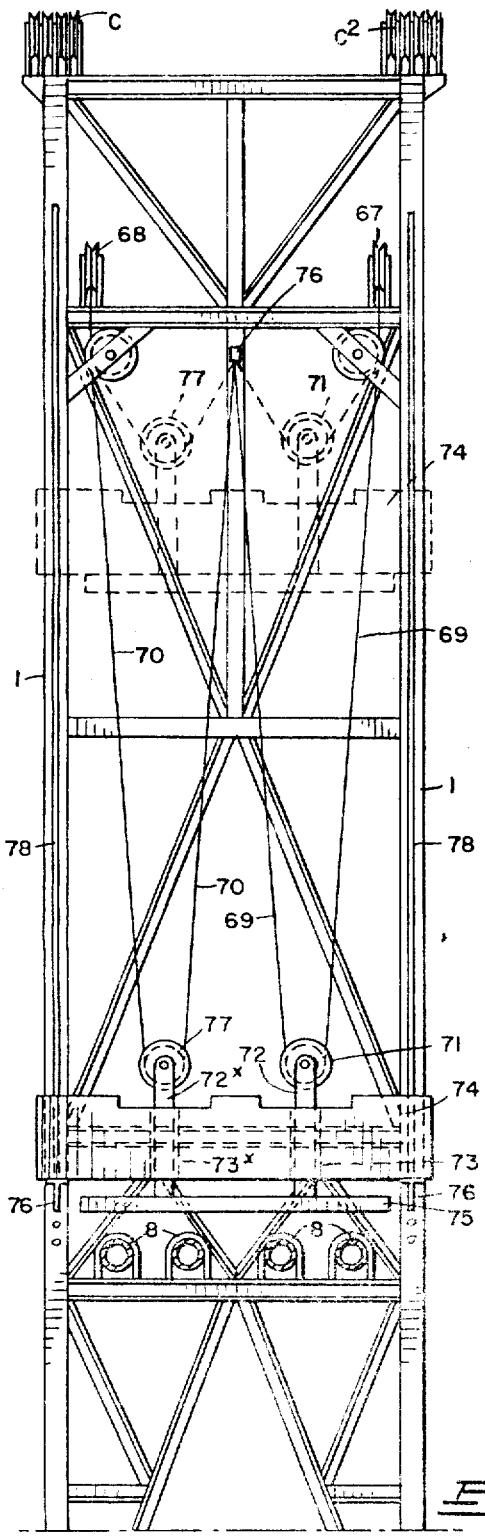
FIGURE 2 is a rear view in elevation of the tower shown in FIGURE 1, taken on the line 2—2 of that figure.

Referring to the drawings, and particularly FIGURES 1 and 2, there is shown at 1 a rigid supporting tower which normally will be carried by a pier, wharf or other terminal point. The base of the tower carries a winch platform, as indicated in FIGURE 1, which may be reached by a ladder or stair arrangement indicated at 3. The primary boom 4 is carried on that face of the tower directly opposite a moored tanker or other fluid-receiving structure, and its opposed outer longitudinal arms (see FIGURE 3) have at their lower ends pivotal connections 5 providing swinging support of the primary boom on the tower. The pivots themselves may have longitudinal passageways for wire ropes.

Figure 3:
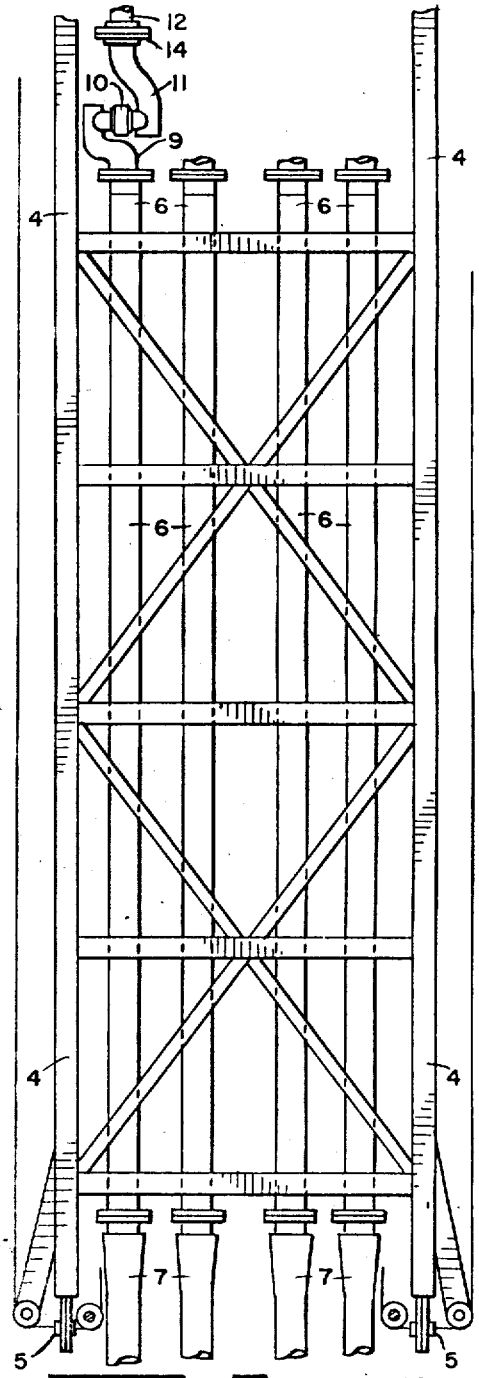
FIGURE 3 is a view in elevation taken rearwardly of the primary boom on the line 3—3, FIG. 1, the upper portion of the boom frame being broken away.
Figure 7:
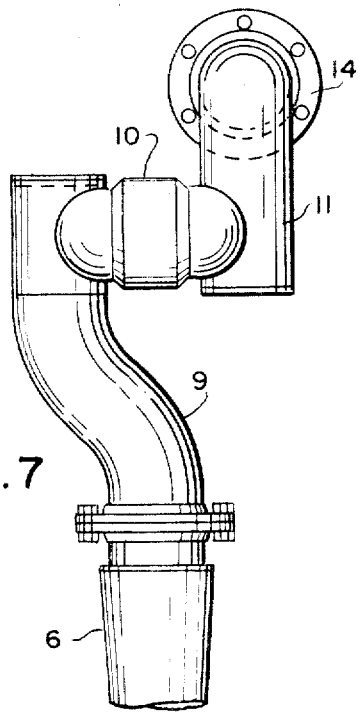
FIGURE 7 is a view illustrating a swivel joint construction employed between each of the fluid feed pipes, shown carried by the main boom in FIGURE 3, and leading to the hose.

In one embodiment of the invention shown in FIGURES 1 to 4, the primary boom carries longitudinally thereof a plurality of rigid pipe conduits 6, FIGURE 3, shown as four in that figure, and each conduit at its lower end is connected by a short length of flexible hose 7, to a conduit 8, FIG. 1, leading to a source of supply for the fluid. At its upper end each rigid pipe conduit 6 is connected to a swivel joint consisting of the members 9, 10 and 11, FIGURE 7, leading to a flexible hose 12, bolted to member 11 at 14.

*The said short lengths of flexible hoses 7 provide fluid flow hinge members which eliminate friction losses due to the usual swivel joint assemblies with two 90° elbows, for example as employed in the structure of my patent, No. 2,922,446. It will be noted that the primary boom is mounted to swing down from a vertically upward position to approximately a horizontal position, which is a total rotational movement of approximately 90°. By mounting the short lengths of hose at about an angle of 45° above horizontal, as shown in FIG. 1, the rotational movement of the primary boom will bend the short lengths of hose through a maximum arc of about 45° upward or downward.*

*The short lengths of hoses cross the pivotal mounting on the primary boom as shown in FIG. 3, and have an inclination which is shown as of about 45° above horizontal in FIG. 1. Thus when the primary boom is at an angle of 45° above the horizontal, the short pivot hoses must be straight. However, when the primary boom is lowered to horizontal, the outer end areas of the hoses move downward through an arc whose center of rotation is at about the pivot point of the boom. When the primary boom is rotated downward, the reactions to the said forced curvature of the short hoses tend to raise the boom, thereby reducing the loads on the boom's hoisting lines and winch. When the boom is in its uppermost vertical position, reactions to the reversed forced curvature of the short hoses, tend to rotate the boom downward. This is particularly useful when strong wind forces on the vertical boom are opposing its lowering by gravity. Also these reactive forces add to the action of gravity to speed the lowering of the boom when it is above its 45° attitude, and below 45° they tend to speed the raising of the boom.*

Figure 6:
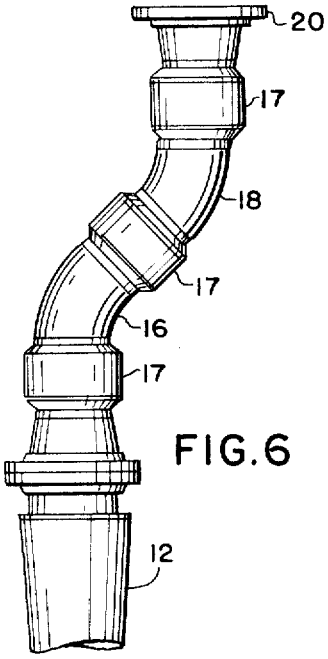
FIGURE 6 is a detail plan view showing the end of a hose and one of the triple swivel joint assemblies adapted for connection with a tanker manifold in accordance with FIGURES 1 and 4.

At the outer end of hose 12, the latter carries a triple-swivel assembly for the manifold, through which oil or other fluid is [purified] *pumped* from or to a tanker or other vessel. As shown in FIGURE 6, the triple-swivel arrangement employs 45° elbows 16 and 18, connecting swivel joints 17 which permit the assembly to rotate through 90 degrees in all directions. By means of the flange 20, the hose may be bolted to a flange of the manifold pipe 21, FIG. 4.

On platform 2 is a motor 23, which may be electrical, hydraulic or air powered for driving a drum 25. A wire rope 27 has one end fixed to the drum 25 and thence leads over a pulley $E^2$ at the top of the tower 1, thence over a pulley $D^1$ on one side of primary boom 4 and thence the cable runs back to the tower and is fixed thereto. For the other side of the primary boom the same arrangement of a cable and pulleys will be employed, said second cable leading at its lower end from drum 25.

The primary boom pivotally carries an auxiliary boom which enables the derrick to move hose up and over the decks of the largest empty tankers at high tide, in which their fluid manifolds are at maximum height. Also, the auxiliary boom enables the derrick to so handle hose with respect to the manifolds of loaded vessels when at low tide, and this at their minimum height relatively to the wharf. The auxiliary boom, as to one side arm thereof, is indicated at 29, FIGS. 1 and 4. Its pivotal point of connection to the primary boom is indicated at 30. At least two side arms, as indicated at 29, are pivotally carried by the primary boom, one at each longitudinal frame member of the primary boom, and those side arms are connected by any suitable reinforcing beams and struts. At their outer ends, the side arms 29 of the auxiliary boom carry a trolley beam 31 (FIGURE 1), a face view of which is shown (partly broken away) in FIGURE 5.

Figure 5:
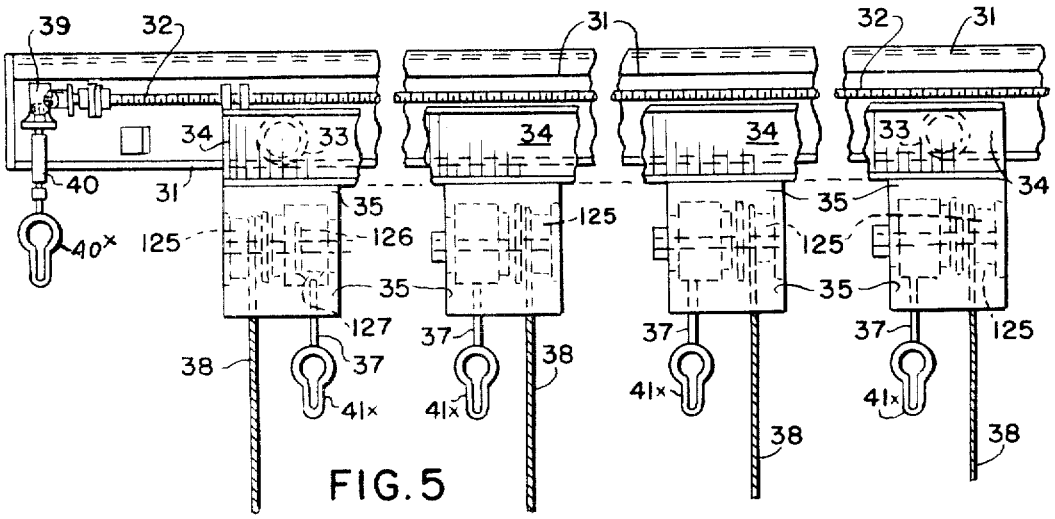
FIGURE 5 is a fragmentary view in front elevation showing the cross arm pivotally suspended from the outer end of the said auxiliary boom having trolley means for mutual side adjustment of a plurality of individual hose hoists, the trolley means and individual hose hoist being adapted for mechanical operation by a special tool assembly described hereinafter.

Referring to FIGURE 5 of the drawings, it will be seen that the trolley beam 31 carries a worm shaft 32, which will be suitably supported in bearing members at its ends. On the base flange of trolley beam 31 are rollers 33 carried by a trolley arm 34, and trolley arm 34 carries a plurality of spaced brackets 35, one for each hose, four brackets being shown in the drawing at FIGURE 5. Each bracket rotationally carries a winch having a drum indicated at 125, carrying a hoist rope 38, for a purpose later to be described.

Worm 32, carried by the trolley beam 31, carries at one end of bevel gear in a housing 39 and in which housing will be customary and well known arrangement of said bevel gear in mesh with a driving bevel gear driven on a rotational connection 40, the latter carrying an eye member 40$^{x}$ adapted to receive the rotational hook end of a hand driving tool. The latter tools are well known in the art and are driven by either [arm] *air* pressure or by electric power. Thus when the hook of such drive member is placed in the eye 40$^{x}$, rotation will be imparted to worm 32 and the latter will be rotated to move brackets 35 to the desired positions of adjustment.

The hoisting means for the auxiliary boom may be as shown and described in my patent, No. 2,922,446, particular with reference to FIGURE 8 of the drawings of said patent and the description thereof.

Figure 4:
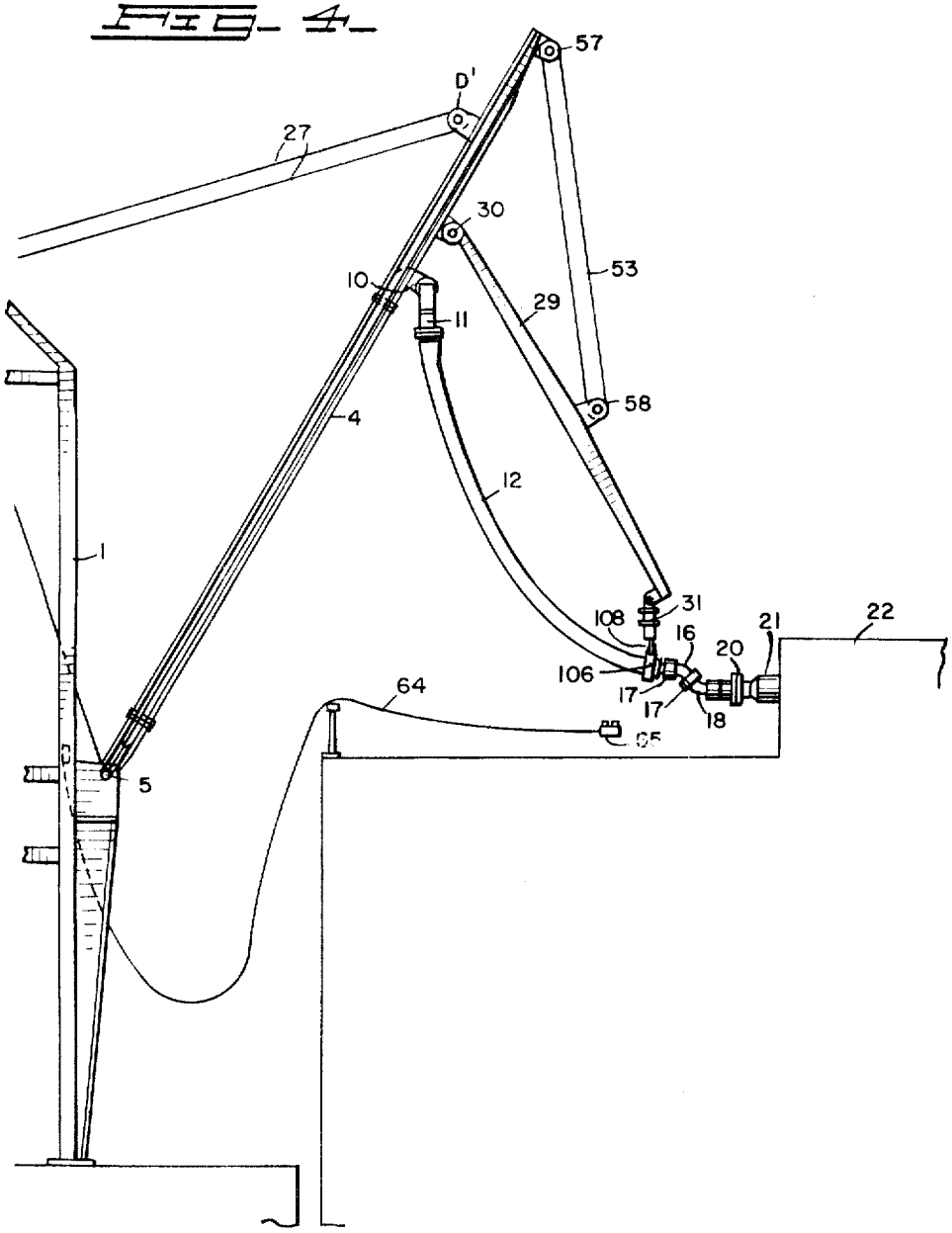
FIGURE 4 is a partial side elevation showing employment of the auxiliary boom in supporting the hose at its swivel coupling means, while being coupled to a tanker's manifold complex.

In FIGURES 1 and 4, there is indicated at 64 an electrical or air conduit for remotely controlling the drums 25 and 50, FIGURE 1, and with a dual valve or electrical switch device at 65 for selectively controlling the operation of the motors for said drums, from a tanker deck or other point such as a wharf adjacent a tanker.

Means are provided for compensatingly counterbalancing the boom structure in such manner that the cables connecting the primary boom with a principal and an auxiliary vertical-lift counterweight, are variably stressed in their varying inclinations, the arrangement including a hanger or hangers and a stop or stops acting upon the principal counterweight in such manner that the latter is caused to come to rest at a desired point along its vertical path of movement, so that only the smaller counterweight provides further counterbalancing force on the boom structure, to which it is connected, during the remaining distance of movement of the boom structure.

The tower at its top rear area carries two pulleys 67 and 68 (FIGURE 2). FIGURE 1 shows that at the top of the tower cable 69 runs over pulley 67, thence over a pulley 67$^{x}$ and down therefrom to an arm on the primary boom projected rearwardly of the boom pivot point 5 when the boom is upright. Cable 70 which runs over pulley 68 (FIGURE 2), will of course have corresponding guide and connections means to the primary boom. Referring to FIGURE 2, cable 69 is led downwardly from pulley 67 to and under a pulley 71, carried by an [rm] *arm* 72 which extends through a passageway at 73, in the larger counterbalancing weight 74, arm 72 carrying the smaller counterweight 75. Cable 69, after leaving pulley 71, is led upwardly and fixed at its end to the tower 1, as a point 76. Cable 70 is led downwardly from pulley 68, thence around a pulley 77 on an arm 72$^{x}$, the latter passing through the passageway at 73$^{x}$ in the larger counterbalance weight 74, said arm 72$^{x}$ being connected to smaller counterweight 75.

Counterweight 74, in its lowest position, rests upon the stop seats 76, which may be provided therefor at any desired elevation; and in the embodiment shown, counterweight 74 is apertured to receive guide rails 78 carried by the tower. Also the lengths of the cables 69 and 70 are sufficient to permit smaller counterweight 75 to hang any desired distance below the counterweight when the latter is inactive, as described.

When the boom structure—referring particularly to the primary boom—is in vertical position, or substantially vertical position, the larger counterweight 74 will rest upon its stop seats 76, so that the tension on cables 69 and 70 will be caused only about the weight of smaller counterweight 75, its arms 72 and 72$^{x}$, and sheaves or pulleys 71, 77. In joint action referring to FIGURE 2, about one half of the weights of said elements is supported through the connection of cables 69 and 70 with the fixed point 76 on the tower, and the other approximate half of the weights is carried to primary boom 4 to retard its gravitational movement downward under the influence of the auxiliary boom and the members carried thereby, in addition to the effect of the tensions in cables 69 and 70 which connect to primary boom 4 at a point behind its pivot 5.

When the tension on hoisting cables for the main boom is released, the boom structure will rotate downwardly, and smaller counterweight 75 will be moved upwardly by cables 69 and 70, until it comes into contact with the larger counterweight 74. Further lowering of the boom structure will raise the large counterweight 74 to an elevated position as dotted line position in FIGURE 2. As the counterweights [descend] *ascend* the angularity of cables 69 and 70 increases the stresses in them, thereby uniformly increasing [sheer] *their* counterweight restraint on boom 4.

In the operation of the invention, when a tanker approaches a loading dock or wharf on which the tower and boom construction is mounted, the auxiliary boom, or both booms, may be raised to such positions that they will be clear of the tanker deck and superstructure. After the tanker is secured in position, the operator will manipulate the booms in such manner that the outer connections of one or a plurality of hose, is positioned with respect to its flange or their flanges, very close to the manifold or manifolds of the tanker. The precise levelling and positioning of the hose flanges relatively to the tanker manifolds, has been difficult in the past when it is realized that a six- or eight-inch hose, as to diameter, and twenty-five to thirty feet in length, will weigh, along with its connections for a tanker manifold, many hundreds of pounds. This, together with motions of the vessel due to winds and tide, have created a problem overcome by the present invention. A substantially contributing improvement factor lies in my employment of a specially designed swivel pipe assembly at the end of hose carried by the boom assembly for connection to a tanker manifold or the like. As to be noted from either FIGURE 4 or FIGURE 6, the [swivel section] *elbow* 16 is turned at an angle approximately 45 degrees relatively to its receiving swivel joint 17, and its companion [swivel pipe section] *elbow* 18 is turned approximately 45 degrees on its receiving swivel joint 19. The large view in FIGURE 6 clarifies the double swivel connection, it being understood that members 17 are swivel joints, members 16 and 18 each having swivel action in member 17.

In the use of the auxiliary boom of FIGURES 1 and 4, that boom being adapted to manipulate the hose, lowering of the auxiliary boom to position at FIGURE 4, and slightly inwardly from that position, will enable release of the hook member 108 from the eye member 106, as to each of the hose, and the auxiliary boom may be swung upwardly and away from obstruction to the deck of the tanker. Thus also, if at a given time, the fluid pumping action is required for only one hose, the other hoses may be hooked onto the auxiliary boom and raised, thus clearing the tanker deck of an unnecessary obstruction.

In the invention a forward or reverse movement of the tanker, such as flotation compelled, which disturbs a prealinement of the hose coupling means to the manifolds, in the directions laterally of the boom construction, can be [corected] *corrected* by lateral shifting of the trolley beam. With respect to the structure of FIGURES 1 and 5, the trolley beam and worm control for the hose cables 38, through brackets 35, will afford such a lateral adjustment of the hose. Referring again to FIGURE 5, and with additional reference to FIGURE 5, and with additional reference to FIGURE 1, it will be noted that trolley beam brackets 35 for the hose lifting cables 38, carry, as to each bracket, a housing which encloses a drum 125, on which cable 38 is wound. As schematically shown only, in FIGURE 5 as to the left hand one of bracket 35, the shaft for drum 125 has fixed thereon a gear 126 driven by bevel gear 127 on [cable] *rod* 37, the [cable] *rod* carrying an eye member 41$^{X}$ adapted to receive a rotary driving tool previously described and which is adapted for selected reverse rotation of drive [cable] *rod* 37.

What I claim is as follows:

1. In a derrick device for supporting, manipulating and handling a flexible hose assembly of the character described, extending from a relatively stationary terminal at an inner end and having an outer terminal hose flange for coupling and uncoupling said assembly to manifold means, including a supporting tower having mounted thereon a main boom along which conduits for said hose assembly are supported, said boom having its lower end pivotally mounted relatively to said tower, and including powerized manipulating means for said main boom extended to and adjacent the other end thereof swingingly to [suport] *support* said main boom, an auxiliary boom mounted on said main boom, and including powerized means [controlled] *driven* from said tower for manipulating said auxiliary boom selectively relatively to and with said main boom, and improvements comprising counterweight means normally disposed at the lower area of the tower, two pulleys connected to said counterweight means, two cables each having one end thereof secured to the tower at its upper central area and thence extended downwardly and looped under one pulley of the counterweight means and thence extending upwardly over a pulley located above and laterally of the point at which said cable is secured to the tower, said counterweight-connected cables thence extending outwardly with respect to the tower and secured to the main boom.

2. In a derrick device for supporting, manipulating and handling a flexible hose assembly of the character described, [extenidng] *extending* from a relatively stationary terminal at the inner end and having an outer terminal hose flange for coupling and uncoupling said assembly to manifold means, including a supporting tower having mounted [thereo] *thereon* a main boom along which conduits for said hose assembly are supported, said boom having its lower end pivotally mounted relatively to said tower, and including powerized manipulating means for said main boom extended to and adjacent the other end thereof swingingly to support said main boom, an auxiliary boom mounted on said main boom, and including powerized means [controlled] *driven* from said tower for manipulating said auxiliary boom selectively relatively to and with said main boom, and improvements comprising an upper relatively heavy counterweight and a lower relatively light counterweight normally and vertically spaced therefrom and adapted to engage the lower area of the heavy counterweight with a lifting movement thereof, means carried by the tower toward its lower end and adapted as a rest for the heavy counterweight in a lowermost position thereof and whilst the light counterweight is suspended below the heavy counterweight for movement relatively to the latter, a pair of spaced pulleys carried by the light counterweight, a pair of cables each having a first end secured to a central upper area of the tower and each cable leading downwardly therefrom and under one of said pulleys, thence leading upward to a point above its aforesaid secured first end, thereby forming a loop around said pulley, means guiding the upper and hence second end portion of each cable loop in a horizontal reach relatively to the top area of the tower, and means connecting said second end of each cable to the main boom.

3. In a derrick device for supporting, manipulating and handling a flexible hose assembly of the character described, extending from a relatively stationary terminal at an inner end and having an outer terminal hose flange for coupling and uncoupling said assembly to manifold means, including a supporting tower having mounted thereon a main boom along which conduits for said hose assembly are supported, said main boom having its lower end pivotally mounted relatively to said tower and including powerized manipulating means for said main boom extended to and adjacent the other end thereof swingingly to support said main boom, an auxiliary boom mounted on said main boom, and including powerized means [controlled] *driven* from said tower for manipulating said auxiliary boom selectively relatively to and with said main boom, and improvements comprising means for aiding the positioning of said flexible hose assembly and the hose outer terminal flange area in each case relatively to the tanker fluid manifold, and consisting of a trolley beam on the outer end of the auxiliary [beam] *boom*, a plurality of brackets mounted on said trolley beam for longitudinal movement thereon, power means for simultaneously moving said brackets in either of two directions on said beam and consisting of a worm shaft longitudinally carried by said beam and operatively connected to said brackets and drive receiving means for rotating the worm shaft, cables leading from said brackets and means for attaching each cable to a hose of said hose assembly for lateral adjustment of the hose relatively to a tanker fluid manifold by power movement of its cable connected bracket, and cooperative multi-rotational adjusting means carried by each of said hoses as its outer end area and comprising plural swivel pipe sections formed by at least two elbow sections rotatable in a [socket] *swivel joint* between them and in [sockets] *swivel joints* at their ends, one end [socket] *swivel joint* being carried by the said hose and the second end socket having means for connection with a tanker fluid receiving manifold, each elbow section being curved approximately 45°.

4. A derrick apparatus constructed in accordance with claim 3, in combination with a drum in each of the brackets and each receiving one of the cables, a shaft on the drum, a driven gear on the drum shaft, a driving gear in mesh with said driven gear, an elongated rotational actuating member carried by said driving gear and extending outwardly of the bracket, said actuating member having an exposed end adapted to receive the rotary drive connection of a power tool.

5. A derrick apparatus constructed in accordance with claim 3, in combination with a drum in each of the brackets and each receiving one of the cables, a shaft on the drum, a driven gear on the drum shaft, a driving gear in mesh with said driven gear, an elongated rod carried by said driving gear and extending outwardly of the bracket, said rod having an eye-like end adapted to receive the hooked drive end of a power tool.

6. A derrick device constructed in accordance with claim 1, in which the primary boom carries a single auxiliary boom, said primary boom having longitudinal side frame members and intermediate reinforcing transverse frame members, a plurality of rigid pipes running longitudinally of said [lonigtudinal] *longitudinal* side members being connected to and reinforcing the latter members and the intermediate frame members, a relatively short flexible hose carried by each pipe at its lower end and operative as a hinge, and a hollow swivel joint connected to the upper end of each rigid pipe and carrying a hose of the auxiliary boom hose assembly.

7. A derrick device constructed in accordance with claim 1 in combination with arm means carried by the main boom intermediate its ends and projected toward the tower when the main boom is upright, guide means carried by the tower at its upper end and guiding the cables in a horizontal reach, and including pulley means disposed above said arm means, said cables extending thence downwardly from said last named pulley means, and each cable leading to a point on said arm means to which said cable is connected, which point is disposed rearwardly of the main boom with respect to a forward and lowering movement thereof, and rearwardly of the pivoted mounting point of the boom on the tower.

*8. In a derrick device for supporting, manipulating and handling a flexible hose assembly of the character described, extending from a relatively stationary terminal at the inner end and having an outer terminal hose flange for coupling and uncoupling said assembly to manifold means, including a supporting tower having mounted thereon a main boom along which conduits for said hose assembly are supported, said boom having its lower end pivotally mounted relatively to said tower, and including powerized manipulating means for said main boom extended to and adjacent the other end thereof swingingly to support said main boom, an auxiliary boom mounted on said main boom, and including powerized means driven from said tower for manipulating said auxiliary boom selectively relatively to and with said boom, counterweight means connected to the main boom, and improvements comprising longitudinal side frame members and intermediate reinforcing transverse frame members forming the primary boom, a plurality of rigid conduit pipes carried by said primary boom and running longitudinally of said longitudinal side members, each of said pipes having its lower end spaced forwardly of the pivot of said primary boom, a relatively short flexible hose carried by each of said pipes at its lower end and crossing the pivot of said primary boom, a fluid supply means rearwardly of said pivot of the primary boom and to which the lower ends of said short flexible hoses are operatively connected, and means connected to the upper end of each of said rigid pipes for carrying a hose.*

*9. A derrick device is constructed in accordance with claim 1, in which the primary boom is formed with longitudinal side frame members and intermediate reinforcing transverse frame members forming the primary boom, a plurality of rigid conduit pipes carried by said primary boom and running longitudinally of said longitudinal side members, each of said pipes having its lower end spaced forwardly of the pivotal mounting of said primary boom, a relatively short flexible hose carried by each of said pipes at its lower end and crossing the pivotal mounting of said primary boom, a fluid supply means rearwardly of said pivotal mounting of the primary boom and to which the lower ends of said short flexible hoses are operatively connected and from which they extend at an upward angle, and means connected to the upper end of each of said rigid pipes for carrying a hose.*

References Cited

The following references, cited by the Examiner, are of record in the patented file of this patent or the original patent.

UNITED STATES PATENTS

| | | | |
|---|---|---|---|
| 2,719,653 | 10/1955 | Bledsoe | 141—388 |
| 2,922,446 | 1/1960 | Sheiry | 141—388 |
| 3,085,593 | 4/1963 | Sorensen | 137—615 |
| 994,386 | 6/1909 | Gustavson | 74—424.8 |
| 2,668,452 | 2/1954 | Hjulian | 74—378 X |
| 2,803,146 | 8/1957 | Brundage | 74—424.8 |
| 2,818,891 | 1/1958 | Loeser | 141—388 |
| 2,914,080 | 11/1959 | Silveston | 137—236 |
| 2,980,150 | 4/1961 | Bily | 137—615 X |
| 3,114,392 | 12/1963 | Harper | 137—615 |

WILLIAM F. O'DEA, *Primary Examiner.*

H. M. COHN, *Assistant Examiner.*